United States Patent [19]

Gaddis

[11] Patent Number: 5,085,025
[45] Date of Patent: Feb. 4, 1992

[54] EXTRUDED TRUCK FRAME STRUCTURE

[75] Inventor: Donald L. Gaddis, Solon, Iowa

[73] Assignee: Courtesy Enterprises, Incorporated, Cedar Rapids, Iowa

[21] Appl. No.: 594,413

[22] Filed: Oct. 9, 1990

[51] Int. Cl.⁵ .................................................. E04C 3/32
[52] U.S. Cl. ...................................... 52/732; 280/107; 280/800; 296/204
[58] Field of Search ................ 52/729, 730, 732, 737, 52/738; 296/204; 280/107, 799, 800

[56] References Cited

U.S. PATENT DOCUMENTS 3,735,998  5/1973  Green .................................. 296/204
3,845,594  11/1974  Butts et al. ............................ 52/729

Primary Examiner—Richard E. Chilcot, Jr.
Assistant Examiner—Kien Nguyen
Attorney, Agent, or Firm—Zarley, McKee, Thomte, Voorhees & Sease

[57] ABSTRACT

A truck frame beam has an elongated vertically disposed web member having inner and outer surfaces and upper and lower ends with a support member on the upper end of the web member, and a foot portion on the lower end of the web member. The support surfaces are angularly disposed with respect to the web member and are comprised of a first surface that extends downwardly and inwardly from the web member, and a second surface that extends upwardly and outwardly with respect to the first surface. The two surfaces are offset with respect to each other, and an elongated channel indentation is positioned between the two support surfaces to receive the cylindrical portion of a hinge element.

8 Claims, 2 Drawing Sheets

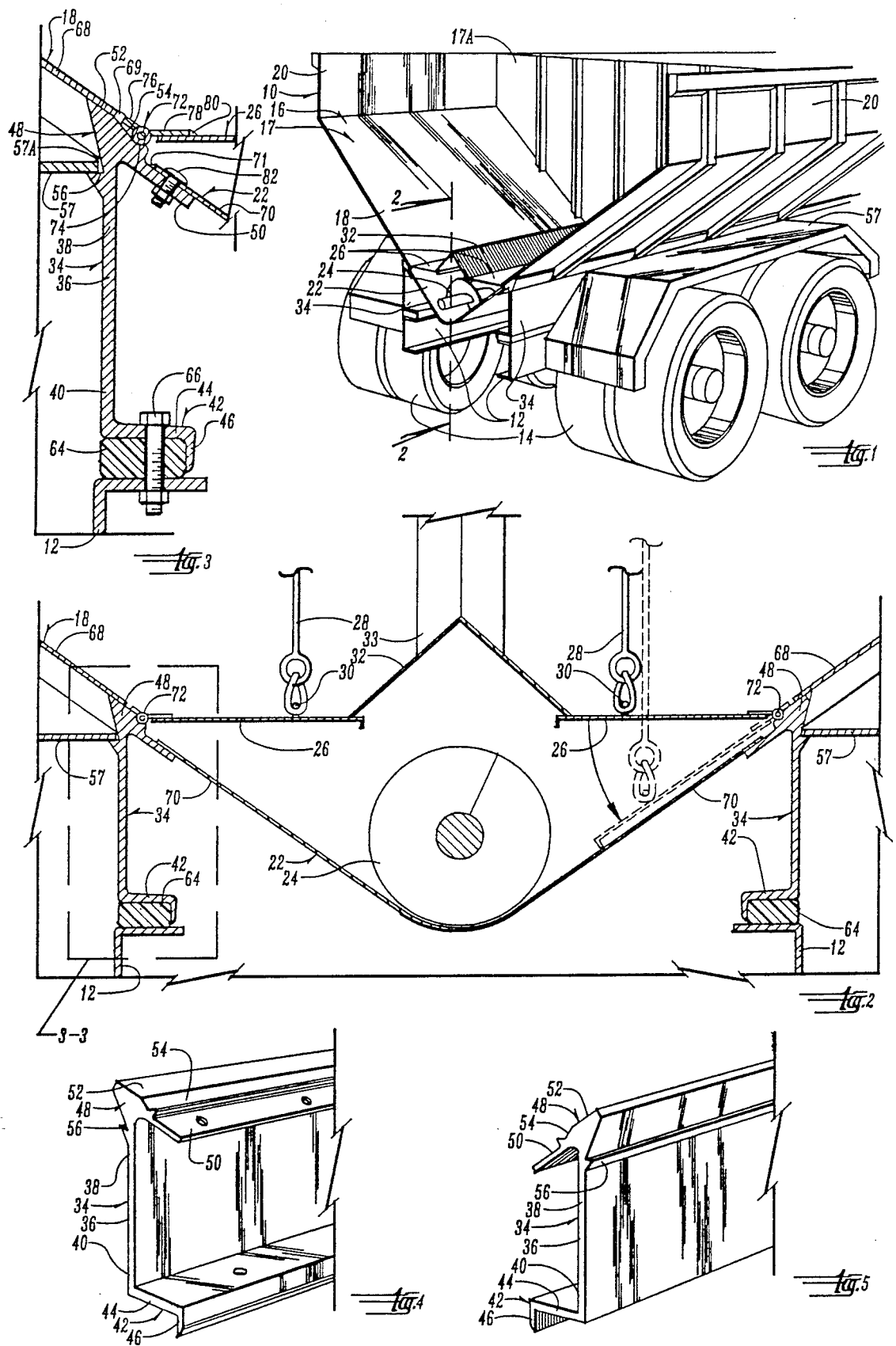

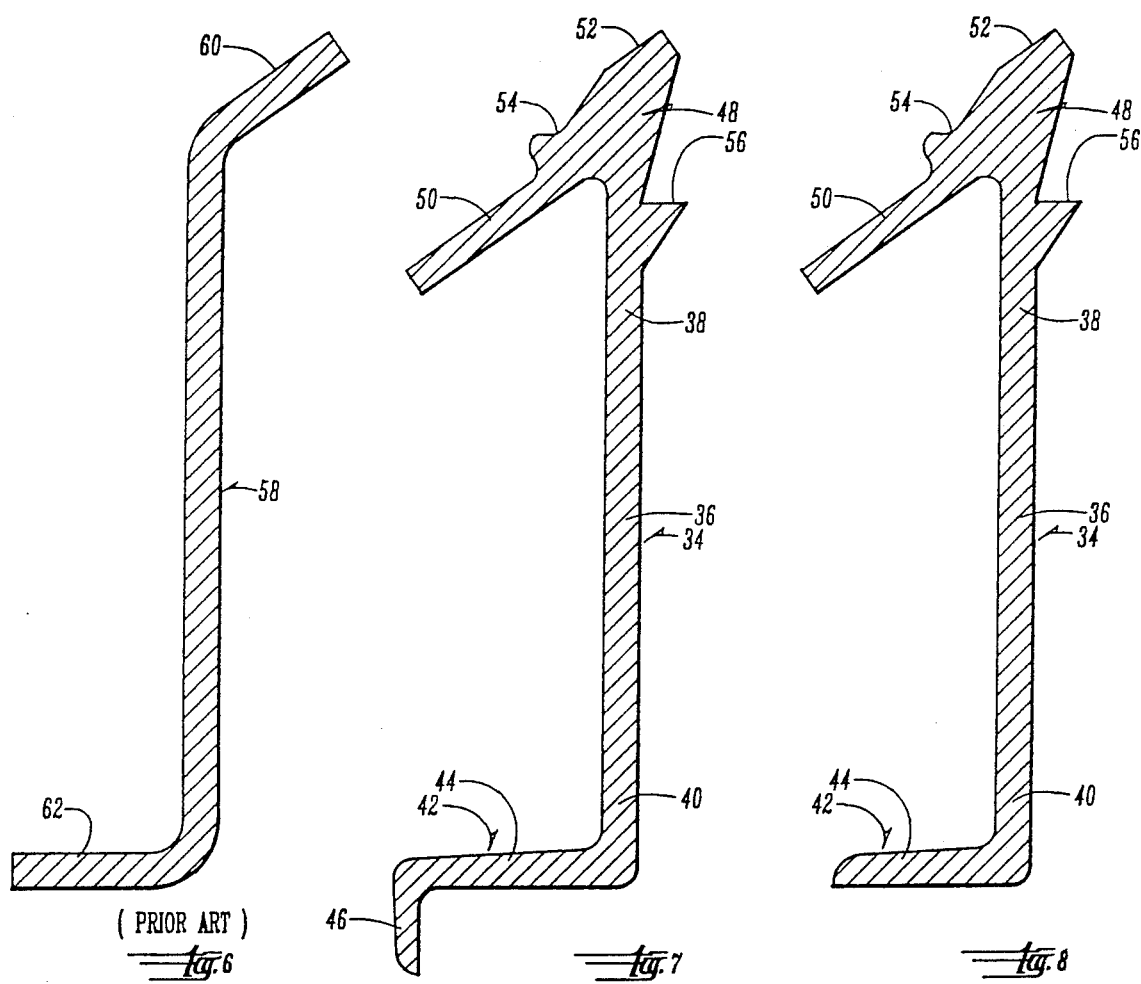

EXTRUDED TRUCK FRAME STRUCTURE

BACKGROUND OF THE INVENTION

It is customary, particularly in agricultural areas, for trucks having V-shaped bottoms to be divided into a plurality of compartments so that one truck can carry a plurality of different quantities of particulate material, such as different feeds or different fertilizers, in various compartments of the truck. The V-shaped truck body is normally equipped with an auger device at the point of the V for unloading purposes, and doors are provided in the bottom portions of the V-shaped bodies in each compartment so that, when opened, the particulate material in a given compartment can be moved into operating engagement with the unloading auger.

The support means for the V-shaped truck body has to accommodate the slope of the tapered bottom of the truck, and must also accommodate the pivotal doors as well as often supporting the truck fenders. Customarily, a pair of elongated beams support the V-shaped truck body, and these beams are formed and bent to shape from a flat piece of structural steel. While such beams do afford adequate strength, they are heavy and do not adequately bring together for easy fabrication all of the various components that they support.

Accordingly, it is a principal object of this invention to provide a truck frame beam that is extruded from lightweight material, such as aluminum, and which has a plurality of supporting surfaces which easily receive and accommodate the various structures which are supported thereby.

A further object of this invention is to provide a truck frame beam that will permit the alignment of the components to be attached thereto which serves to facilitate the welding process whereby the various components are joined to the beam.

These and other objects will be apparent to those skilled in the art.

SUMMARY OF THE INVENTION

The truck frame beam of this invention comprises an elongated vertically disposed web member having inner and outer surfaces and upper and lower ends with a support member on the upper end of the web member, and a foot portion on the lower end of the web member.

The support surfaces are angularly disposed with respect to the web member and are comprised of a first surface that extends downwardly and inwardly from the web member, and a second surface that extends upwardly and outwardly with respect to the first surface. The two surfaces are offset with respect to each other, and an elongated channel indentation is positioned between the two support surfaces to receive the cylindrical portion of a hinge element.

BRIEF DESCRIPTION OF THE DRAWINGS

FIG. 1 is a partial rearward perspective view of a truck embodying the beam structure of this invention;

FIG. 2 is an enlarged scale sectional view taken on line 2—2 of FIG. 1;

FIG. 3 is an enlarged scale sectional view taken on line 3—3 of FIG. 2;

FIG. 4 is a partial perspective view of one side of the beam structure of this invention;

FIG. 5 is a view similar to that of FIG. 4 but shows the other side of the beam structure;

FIG. 6 is an enlarged scale sectional view through a prior art beam structure;

FIG. 7 is an enlarged scale sectional view through the beam structure of this invention; and FIG. 8 is a sectional view similar to FIG. 7 showing a modified beam structure of this invention.

DESCRIPTION OF THE PREFERRED EMBODIMENT

A feed truck 10 has a conventional base frame 12 comprised of two parallel channel frame members. Conventional wheels 14 support base frame 12.

A truck body 16 having a plurality of compartments 17 separated by walls 17A has a V-shaped floor 18. Vertical top sides 20 extend upwardly from each side of the V-shaped floor 18. The body 16 has a bottom 22 which supports a conventional discharge auger 24 secured to a source of rotational power (not shown).

Spaced pivotal doors 26 (FIG. 2) extend from opposite sides of the V-shaped floor 18 in a manner to be described hereafter. Conventional cables 28 are secured to hooks 30 which are in turn secured to doors 26 so that when the cables 28 are lowered, the doors move downwardly to an open position to permit particulate material in a given compartment to move into access to the auger 24. Each compartment 17 has a pair of doors 26. An inverted V-shaped baffle 32 secured to and supported by frame member 33 closes the space between the doors 26 (see FIG. 2).

The structure so far described is essentially typical of prior art truck bodies which have served the industry in the past.

The beam 34 of this invention is extruded from aluminum material and is of integral construction. Beam 34 is comprised of a vertical web 36 having an upper end 38 and a lower end 40. A foot 42 is formed on the lower end of web 36 and is comprised of a horizontal foot segment 44 and a vertical foot segment 46 (FIG. 7). The use of the vertical foot segment 46 is optional as seen by an alternate form of the invention in FIG. 8 where segment 46 has been eliminated.

A support member 48 is formed at the upper end of web 36 and is comprised of a first support surface 50 which is offset from an parallel to a second support surface 52. Support surfaces 50 and 52 are angularly disposed with respect to the vertical axis of web 36. An elongated concave channel 54 is formed in support member 48 between the two support surfaces 50 and 52 (FIG. 7). A horizontal support shelf 56 is formed at the upper end of web 36 immediately below support member 48. Shelf 56 serves as a support surface for fender 57 which is welded to shelf 56 as indicated by the numeral 57A (FIG. 2). The prior art beam 58 shown in FIG. 6 has a support member 60 and a foot 62 which differ considerably from the corresponding structure of beam 34.

As best shown in FIG. 3, a rubber pad 64 can be placed underneath foot 42 to cushion the weight of beam 34 on the base frame 12. Nut and bolt assembly 66 can be used to secure the beams 34 to the base frame 12 as shown in FIG. 3.

With reference to FIGS. 2 and 3, upper floor segments 68 are welded to support surfaces 52 at 69. Similarly, lower floor segments 70 are welded to support surface 50 at 71. It is important to note that the angular positions of the support surfaces 50 and 52 define the angular position of the floor segments 68 and 70 so that when the welding process takes place, the floor segments are in proper alignment.

Hinge 72 (FIG. 3) has a central cylindrical portion 74 with hinge segments 76 and 78. The cylindrical portion 74 of hinge 72 is received in the channel indentation 54 in the support member 48 of beam 34. When in this position, the hinge is precisely aligned and ready for welding to adjacent components. In that regard, hinge segment 76 is welded to support surface 52 at 69, and hinge segment 78 is welded to door 26 at 80.

As shown in FIG. 3, nut and bolt assemblies 82 can be further utilized to interconnect the lower support surface 50 to the lower floor segment 70 in addition to the weldment at 71.

The fender 57 during fabrication is mounted so that the upper edge thereof rests on shelf 56 and is thus disposed in its predetermined aligned position. A weldment 57A secures the fender to the beam 34.

The extruded lightweight beam 34 is a vast improvement over the prior art beam shown in FIG. 6. It is lighter, and it has predetermined support surfaces to accommodate all of the components that are secured thereto. It would be virtually impossible to create these highly desirable support surfaces by bending a single plate of structural steel. These support surfaces align the components during fabrication, and facilitate the welding process.

It is therefore seen that this invention achieves its stated objectives.

I claim:

1. A truck frame beam, comprising,
an elongated vertically disposed web member having inner and outer surfaces, and upper and lower ends,
a support member on the upper end of said web member,
said support member having oppositely disposed offset parallel support surfaces,
said support surfaces are angularly disposed with respect to said web member,
said support surfaces comprising a first surface that extends downwardly and inwardly from said web member, and a second surface that extends upwardly and outwardly with respect to said first surface.

2. The device of claim 1 wherein said support member has an elongated channel indentation positioned between said first and said second surface.

3. The device of claim 1 wherein a horizontal support surface extends outwardly from the upper end of said web member.

4. The device of claim 1 wherein a foot portion is on the lower end of said web member.

5. The device of claim 4 wherein said foot portion includes a first foot segment which extends at right angles to said web member.

6. The device of claim 5 wherein said first foot segment has an inner edge, and second foot segment extends downwardly from said inner edge.

7. The device of claim 1 wherein said beam is of integral extruded metal construction.

8. The device of claim 7 wherein said beam is comprised of a metal having the strength and weight characteristics substantially as those of aluminum.

* * * * *